United States Patent
Corrao et al.

(10) Patent No.: US 10,129,327 B2
(45) Date of Patent: *Nov. 13, 2018

(54) RETRIEVAL OF A FILE FROM MULTIPLE STORAGE NODES

(71) Applicant: International Business Machines Corporation, Armonk, NY (US)

(72) Inventors: Ann Corrao, Raleigh, NC (US); Ranganath G. Iyengar, Karnataka (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/619,616

(22) Filed: Jun. 12, 2017

(65) Prior Publication Data

US 2017/0289238 A1      Oct. 5, 2017

Related U.S. Application Data

(63) Continuation of application No. 14/842,279, filed on Sep. 1, 2015, now Pat. No. 9,756,117.

(51) Int. Cl.
*G06F 17/30* (2006.01)
*H04L 29/08* (2006.01)
(Continued)

(52) U.S. Cl.
CPC ........... *H04L 67/06* (2013.01); *G06F 3/06* (2013.01); *G06F 17/30* (2013.01);
(Continued)

(58) Field of Classification Search
CPC ............ G06F 17/30; G06F 17/30011; G06F 17/30861; G06F 17/30017; G06F 17/30244; G06F 17/30781; G06F 17/30197; G06F 17/30203; G06F 17/30386; G06F 17/30079; G06F 17/30115; G06F 17/30194; G06F 17/302; H04L 12/583; H04N 21/23106
See application file for complete search history.

(56) References Cited

U.S. PATENT DOCUMENTS 8,499,129 B1     7/2013   Bezbaruah et al.
9,756,117 B2 *   9/2017   Corrao .............. G06F 17/30781
(Continued)

OTHER PUBLICATIONS

Publisher: Openstack cloud software, Chapter 13, Object Storage Node, Day 9, Retrieved from Internet URL: http://docs.openstack.org/training-guides/content/operator-object-storage-node.html, 9 pages.
Notice of Allowance (dated Apr. 27, 2017) for U.S. Appl. No. 14/842,279, filed Sep. 1, 2015.

*Primary Examiner* — Le H Luu
(74) *Attorney, Agent, or Firm* — Schmeiser, Olsen & Watts, LLP; Mark Vallone

(57) ABSTRACT

A system and associated computer program product for retrieving a file from a distribution of storage nodes. A client computer sends a request for a file to a proxy layer and in response, the proxy layer generates a script for obtaining the requested file and sends the script to the client computer. The client computer executes the script, resulting in portions of the requested file being obtained from respective storage nodes in a storage layer. The portions of the requested file are concatenated to form the requested file.

20 Claims, 11 Drawing Sheets

(51) Int. Cl.
*G06F 3/06* (2006.01)
*G06F 11/00* (2006.01)

(52) U.S. Cl.
CPC .. *G06F 17/30011* (2013.01); *G06F 17/30017* (2013.01); *G06F 17/30197* (2013.01); *G06F 17/30203* (2013.01); *G06F 17/30244* (2013.01); *G06F 17/30386* (2013.01); *G06F 17/30781* (2013.01); *G06F 17/30861* (2013.01); *H04L 67/1002* (2013.01); *H04L 67/1097* (2013.01); *H04L 67/288* (2013.01); *H04L 67/34* (2013.01); *G06F 11/00* (2013.01)

(56) References Cited

U.S. PATENT DOCUMENTS

| | | | | |
|---|---|---|---|---|
| 2007/0124415 | A1* | 5/2007 | Lev-Ran | H04L 51/063 |
| | | | | 709/217 |
| 2009/0210431 | A1* | 8/2009 | Marinkovic | G06F 17/302 |
| 2011/0231569 | A1* | 9/2011 | Luby | H04N 21/23106 |
| | | | | 709/234 |
| 2011/0239078 | A1* | 9/2011 | Luby | H04N 21/23106 |
| | | | | 714/752 |
| 2013/0041872 | A1* | 2/2013 | Aizman | G06F 17/30194 |
| | | | | 707/690 |
| 2013/0325916 | A1* | 12/2013 | Pitts | G06F 17/30115 |
| | | | | 707/827 |
| 2015/0066852 | A1* | 3/2015 | Beard | G06F 17/30079 |
| | | | | 707/625 |
| 2017/0063963 | A1 | 3/2017 | Corrao et al. | |

* cited by examiner

US 10,129,327 B2

RETRIEVAL OF A FILE FROM MULTIPLE STORAGE NODES

This application is a continuation application claiming priority to Ser. No. 14/842,279, filed Sep. 1, 2015, now U.S. Pat. No. 9,756,117, issued Sep. 5, 2017.

TECHNICAL FIELD

The present invention is directed to retrieving a file from multiple storage nodes.

BACKGROUND

Data striping distributes data segments of a file sequentially on different physical storage devices, which enables the segments to be fetched concurrently to efficiently synthesize the file. However, data striping is vulnerable to reliability problems due to possible failure of a storage device on which one of the segments is stored. Data striping provides higher performance since data is read from multiple drives simultaneously. However, data striping is implemented with expensive technologies such as RAID, parallel file systems, etc.

An alternate method of storing the data has emerged in which multiple copies of the data are stored on different computers and drives. This alternate method provides reliability by keeping multiple copies of the data, but does not provide higher read performance since the data is always read from a single drive.

There is a need for efficient retrieval of the segments of a file without the existing problems of the prior art.

BRIEF SUMMARY

The present invention provides a method, and associated system and computer program product, for retrieving a file from a distribution of storage nodes.

A client computer sends, to a first proxy node of P proxy nodes in a proxy layer, a request for the file, wherein each proxy node of the P proxy nodes is a computer, wherein a copy of the file is stored in each data store of N data stores, wherein each data store of the N data stores may be accessed by a respective storage node of N storage nodes, wherein each storage node of the N storage nodes is a computer, and wherein $N \geq 2$ and $P \geq 2$.

After sending the request for the file, the client compute receives, from a second proxy node of the P proxy nodes, a script for obtaining the requested file.

The client computer executes the received script, wherein executing the script comprises the client computer sending M requests, either directly and in parallel to M respective proxy nodes of the P proxy nodes or directly and in parallel to M respective storage nodes of the N storage nodes, wherein the M requests are for the M storage nodes to provide M respective portions of the requested file, wherein the M portions are different, non-overlapping portions of the requested file, wherein the requested file comprises the M portions, and wherein $2 \leq M \leq N$ and $M \leq P$.

After said sending M requests and after the M portions have been read by the M storage nodes from M respective data stores of the N data stores: (i) the client computer receives the requested file from a third proxy node of the P proxy nodes after the M proxy nodes have received the respective M portions from the M storage nodes and after the third proxy node has concatenated, by using the script, the M portions which generates the requested file as a concatenation of the M portions, (ii) the client computer receives the M portions directly from the M proxy nodes after the M proxy nodes have received the M portions from the M storage nodes, respectively, or (iii) the client computer receives the M portions directly from the M storage nodes.

If the client computer received the M portions directly from the M proxy nodes or directly from the M storage nodes, then the client computer concatenates, by the script, the M portions, which generates the requested file as a concatenation of the M portions.

The present invention provides a method, and associated system and computer program product, for retrieving a file from a distribution of storage nodes.

A first proxy node of P proxy nodes in a proxy layer receives, from a client computer, a request for the file, wherein each proxy node of the P proxy nodes is a computer, wherein a copy of the file is stored in each data store of N data stores, wherein each data store of the N data stores may be accessed by a respective storage node of N storage nodes, wherein each storage node of the N storage nodes is a computer, and wherein $N \geq 2$ and $P \geq 2$.

In response to the request for the file, a second proxy node of the P proxy nodes generates a script for obtaining the requested file.

The second proxy node sends the generated script to the client computer, after which the script is executed by the client computer, wherein during execution of the script by the client computer, M requests are sent by the client computer either directly and in parallel to M respective proxy nodes of the P proxy nodes or directly and in parallel to M respective storage nodes of the N storage nodes, wherein the M requests are for the M storage nodes to provide M respective portions of the requested file, wherein the M portions are different, non-overlapping portions of the requested file, wherein the requested file comprises the M portions, and wherein $2 \leq M \leq N$ and $M \leq P$.

After the M requests have been sent by the client computer and after the M portions have been read by the M storage nodes from M respective data stores of the N data stores: (i) the requested file is received by the client computer from a third proxy node of the P proxy nodes after the third proxy node has received the M portions from the M storage nodes and has concatenated the M portions which generates the requested file as a concatenation of the M portions, (ii) the M portions are received directly by the client computer from the M storage nodes, or (iii) the M proxy nodes receiving the M portions from the M storage nodes, respectively, and the M proxy nodes send the M portions directly to the client computer.

If the M portions are received by the client computer directly from the M storage nodes or directly from the M proxy nodes, then the client computer is enabled to concatenate, by the script, the M portions to generate the requested file as a concatenation of the M portions.

DETAILED DESCRIPTION

Figure 1:
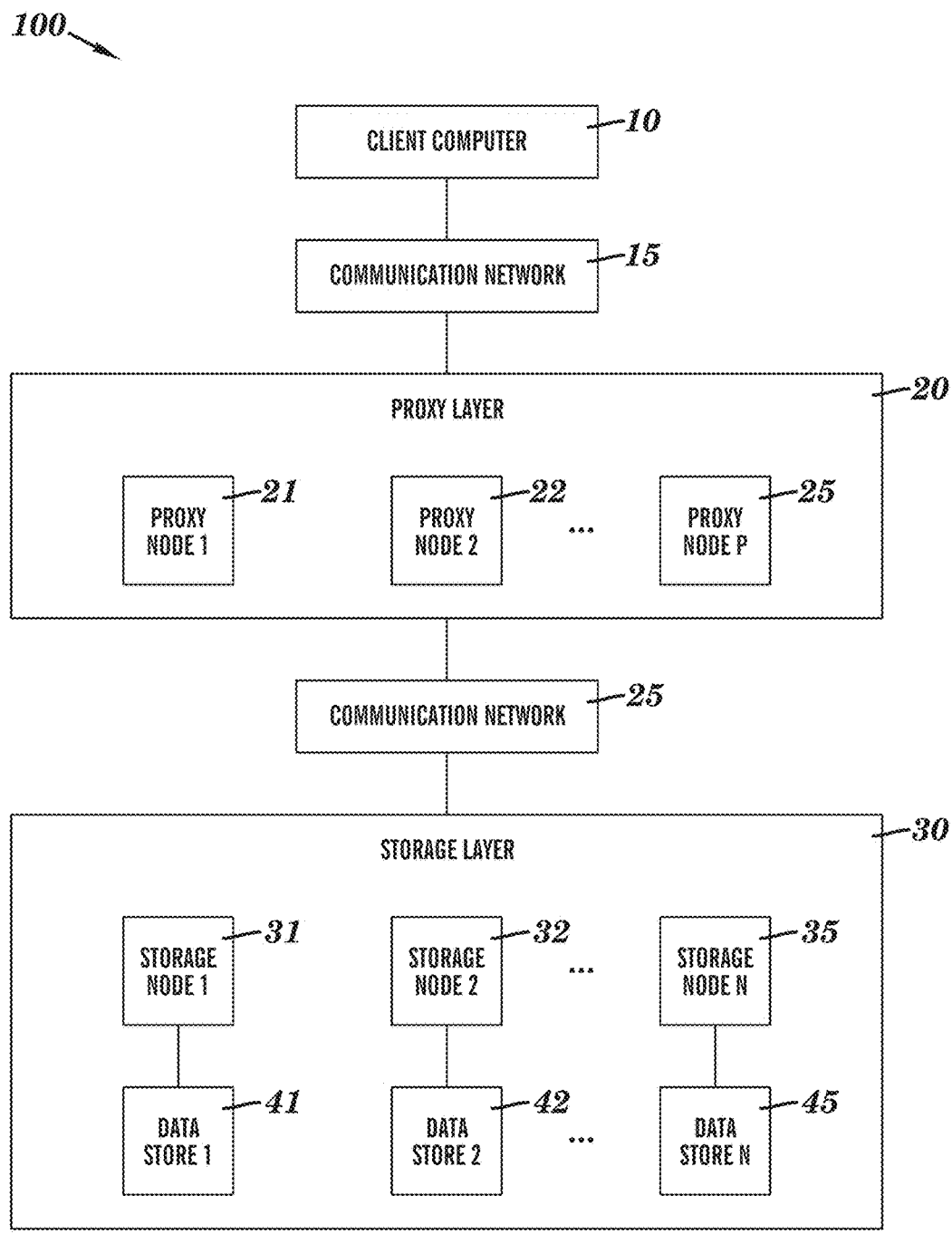
FIG. 1 depicts a system that comprises a client computer, a first communication network, a proxy layer, a second communication network, and a storage layer, in accordance with embodiments of the present invention.

FIG. 1 depicts a system 100 that comprises a client computer 10, a communication network 15, a proxy layer 20, a communication network 25, and a storage layer 30, in accordance with embodiments of the present invention. The client computer 10 communicates with the proxy layer 20 the communication network 15. The proxy layer 20 communicates with the storage layer 30 via the communication network 25. In one embodiment, the client computer 10 communicates with the storage layer 30 via the proxy layer 20 as shown. In one embodiment, the client computer 10 communicates with the storage layer 30 directly, via communication network 15 and/or communication network 25, without communicating with the proxy layer 20.

The communication network 15 and the communication network 25 may each independently be any known type of communication network such as, inter alia, the Internet, an Intranet, a local area network (LAN), a wide area network (WAN), etc. In one embodiment, the communication network 15 and the communication network 25 are a same communication network through which the client computer 10, the proxy layer 20, and the storage layer 30 may communicate with each other or with one another. In one embodiment, the communication network 15 and the communication network 25 are different communication networks.

The proxy layer 20 comprises P proxy nodes (i.e., proxy node 1, proxy node 2, . . . , proxy node P, represented by reference numerals 21, 22, . . . , 25, respectively), wherein each proxy node is a computer, and wherein P is at least 2. Each proxy node is able to communicate with, and exchange data with, any other proxy node in the proxy layer 20.

The storage layer 30 comprises N storage nodes (i.e., storage node 1, storage node 2, . . . , storage node N, represented by reference numerals 31, 32, . . . , 35, respectively), wherein each storage node is a computer, and wherein N is at least 2. In one embodiment, each storage node is a server computer at an Internet web site.

Each storage node has access to a respective data store. Thus, there are N data stores (i.e., data store 1, data store 2, . . . , data store N, represented by reference numerals 41, 42, . . . , 45, respectively). Each data store is configured to store data in one or more physical storage devices or memory (e.g., disk, RAM, etc.).

Figure 2:
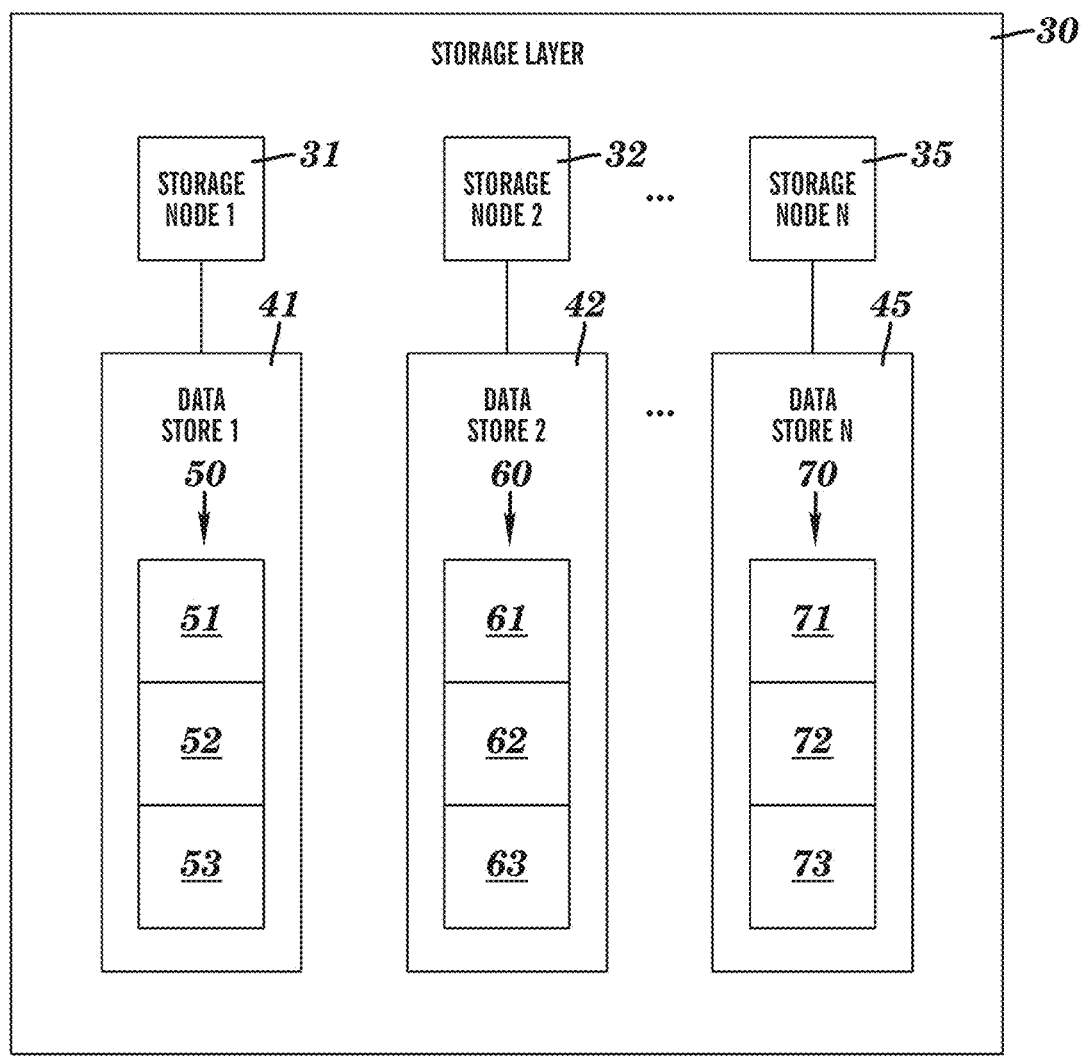
FIG. 2 depicts the storage layer in the system of FIG. 1 as comprising identical copies of a file, in accordance with embodiments of the present invention.

In one embodiment, each proxy node in the proxy layer 20 has knowledge of, or data from which such knowledge may be determined, of the addresses for accessing all of the storage nodes in the storage layer 30 and knowledge of static and dynamic characteristics of each storage node. Such static and dynamic characteristics of the storage nodes may include: a geographic distance between the client computer and each of the storage nodes, a geographic distance between each of the proxy nodes and each of the storage nodes, an average bandwidth for data traffic between each of the proxy nodes and each of storage nodes, an average response time of each of the storage nodes for reacting to data requests made to each of the storage nodes and/or made to each of the proxy nodes, or combinations thereof;

FIG. 2 depicts the storage layer 30 in the system 100 of FIG. 1 as comprising N identical copies 50, 60, . . . , 70 of a file, in accordance with embodiments of the present invention. The copies 50, 60, . . . , 70 of the file are stored in the N data stores 41, 42, . . . , 45, respectively. The file copy 50 in data store 41 comprises multiple records grouped into file portions 51, 52, and 53 such that each file portion comprises one or more records of the file copy 50 and the file 50 consists of the file portions 51, 52, and 53. The file copy 60 in data store 42 comprises multiple records grouped into file portions 61, 62, and 63 such that each file portion comprises one or more records of the file copy 60 and the file 60 consists of the file portions 61, 62, and 63. The file copy 70 in data store 45 comprises multiple records groups into file portions 71, 72, and 73 such that each file portion comprises one or more records of the file copy 70 and the file 70 consists of the file portions 71, 72, and 73.

In one embodiment, the N data stores (41, 42, . . . , 45) are an object store in which the stored file copies are objects.

With the present invention, the client system 10 requests the file having the copies 50, 60, . . . , 70, and obtains respective portions of the files 50, 60, . . . , 70. For example, the requested file may be obtained for the client system 10 as a concatenation of file portions 51, 62, and 73 obtained from file copies 50, 60, and 70, respectively.

In one embodiment, the file portions in the file copies 50, 60, . . . , 70 used to form the requested file for the client computer 10 may be predetermined before the file is requested by the client computer 10, as will be discussed infra.

In one embodiment, the file portions in the copies 50, 60, . . . , 70 used to form the requested file for the client computer 10 may be determined dynamically, by one of the proxy nodes in proxy layer 20, in response to the request for the file by the client computer 10 as will be discussed infra.

In one embodiment, respective portions of M copies of the requested file are obtained from respective M storage nodes of the N storage nodes to form the requested file for the client computer 10 (e.g., from storage nodes 1, 2, . . . , M wherein either M=N or M<N).

In one embodiment, the M file copies, from which portions are obtained to form the requested file, are specified before client system 10 requests the file.

Figure 5A:
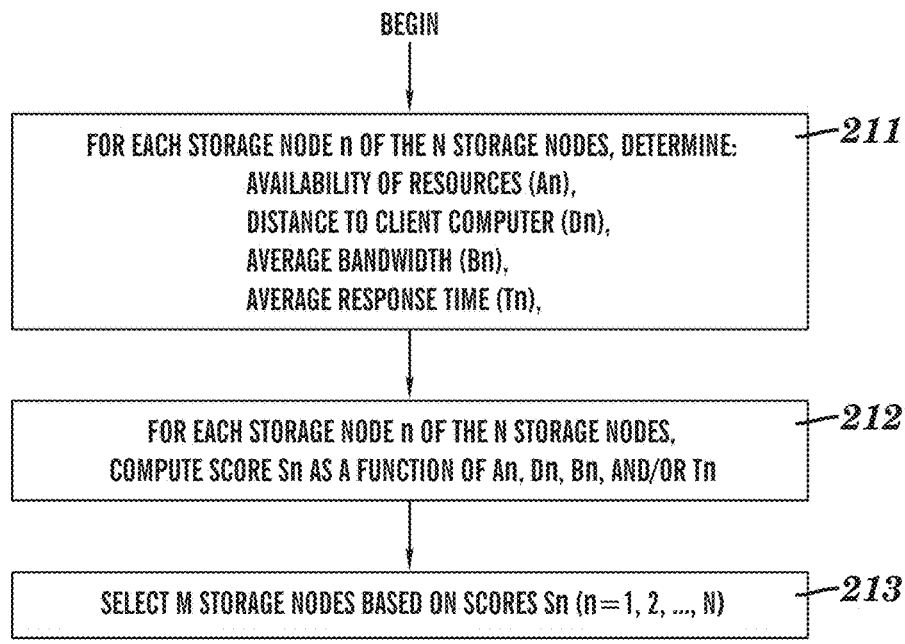
FIG. 5A is a flow chart for determining, by the script generated in a step of FIG. 3, file copies in respective data stores from which respective portions are obtained to form the requested file, in accordance with embodiments of the present invention.

In one embodiment, the M file copies, from which portions are obtained to form the requested file, are determined dynamically in response to the request, by the client computer 10, for the file as discussed infra in conjunction with FIG. 5A.

In one embodiment, the file portions in the file copies 50, 60, and 70 (or M file copies generally) used to form the requested file for the client computer 10 may be predetermined before the file is requested by the client computer 10. The relative sizes of the predetermined portions in each file copy 50, 60, and 70 may be a same relative size for each file copy or may vary among the different file copies. In one embodiment, the sizes of the predetermined portions in file copies 50, 60, and/or 70 are about equal sizes. It may not be possible to have exactly the same size for the portions within a given file copy 50, 60, or 70 unless an individual record is divided between two file portions, since the number of equal-sized records in a given file copy may not be an exact multiple of the number of file portions in the given file copy and/or the number of bytes in each record of the file copy may vary among the records in the given file copy.

Figure 5B:
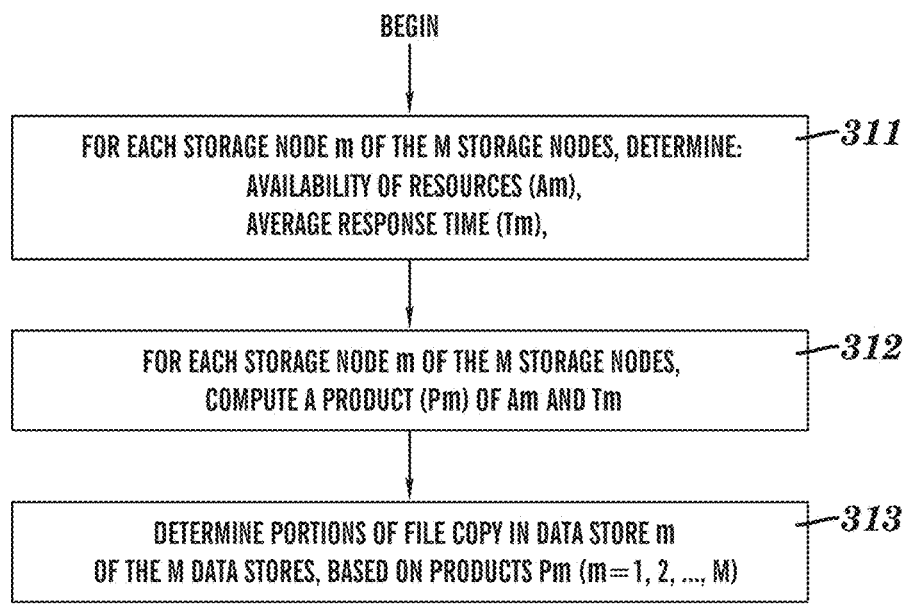
FIG. 5B is a flow chart for determining, by the script generated in a step of FIG. 3, the file portions in file copies in respective data stores in the storage layer, in accordance with embodiments of the present invention.

In one embodiment, the file portions in the file copies 50, 60, and 70 (or M file copies generally) used to form the requested file for the client computer 10 may be determined dynamically, by one of the proxy nodes in proxy layer 20, in response to the request for the file by the client computer 10 as discussed infra in conjunction with FIG. 5B.

While FIG. 2 explicitly depicts three storage nodes (31, 32, 35), there are generally N storage nodes in the storage layer 30, wherein N is at least 2, as denoted by Storage Node N represented by reference numeral 35.

Figure 3:
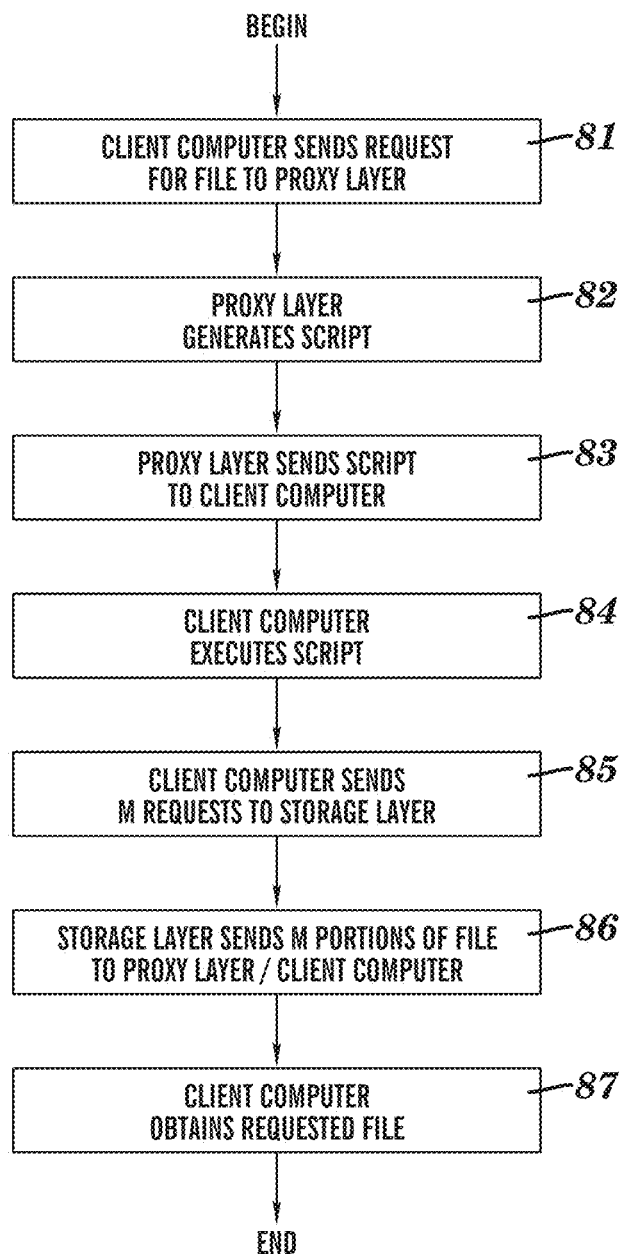
FIG. 3 is a flow chart describing a method for retrieving a requested file from the storage nodes in the storage layer in the system of FIG. 1, in accordance with embodiments of the present invention.

FIG. 3 is a flow chart describing a method for retrieving a requested file from the storage nodes 31, 32, . . . , 35 in the storage layer 30, in accordance with embodiments of the present invention. The flow chart of FIG. 3 includes steps 81-87 and utilizes the system 100 of FIG. 1.

In step 81, the client computer 10 sends, to a first proxy node of the P proxy nodes in the proxy layer 20, a request for a file, after which the first proxy node receives the request for the file sent by the client computer 10. The first proxy node is any proxy node of the proxy nodes proxy node 1, proxy node 2, . . . , proxy node P. Each proxy node of the P proxy nodes is a computer. A copy of the file is stored in each data store of the N data stores (i.e., data store 1, date store 2, . . . , data store N). Each data store of the N data stores may be accessed by a respective storage node of N storage nodes, wherein each storage node of the N storage nodes is a computer. N and P have a value subject to N≥2 and P≥2, respectively.

In step 82, a second proxy node in the proxy later 20 generates a script obtaining the requested file; more specifically for: obtaining portions of the requested file from respective data stores in the storage layer 30, concatenating the obtained portions of the file to form the requested file, and having client computer 10 obtain the formed file. The script is a sequence of program instructions written in any known scripting language (e.g., JavaScript, AppleScript, a Unix shell script, etc.).

The second proxy node is any proxy node of the P proxy nodes (i.e., proxy node 1, proxy node 2, . . . , proxy node P). In one embodiment, the first and second proxy nodes are a same proxy node. In one embodiment, the first and second proxy nodes are different proxy nodes such that the second proxy node is notified by the first proxy node of the request, by the client computer 10, for the file.

In step 83, the second proxy node sends the generated script to the client computer 10.

In step 84, after the client computer 10 receives the script sent by the second proxy node, the client computer 10 interprets and executes the script.

Figure 4:
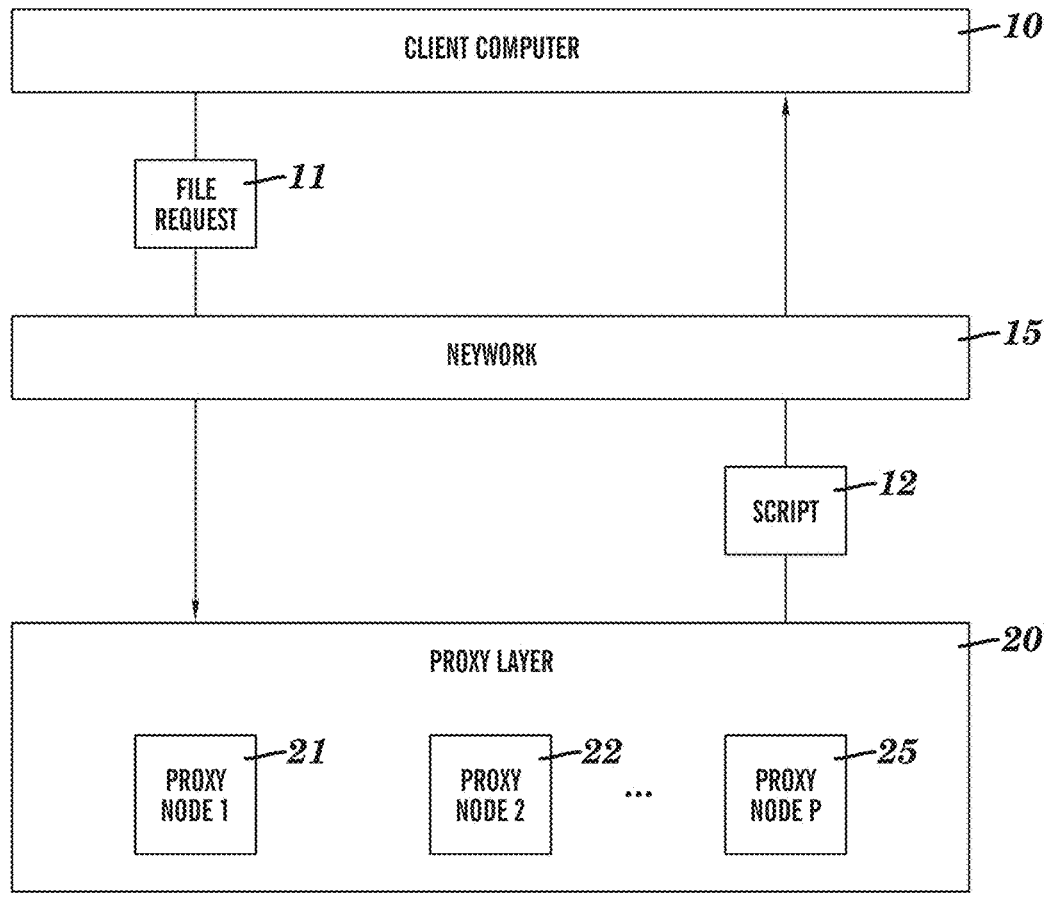
FIG. 4 illustrates steps of FIG. 3 for sending a request (by the client computer to the proxy layer) for the requested file in the storage layer and sending a script (by the proxy layer to the client computer), in accordance with embodiments of the present invention.

FIG. 4 illustrates steps 81-83 of FIG. 3 for sending the request 11 for the file (by the client computer 10 to a first proxy node in proxy layer 20) and sending the script 12 (by a second proxy node in proxy layer 20 to the client computer 10), in accordance with embodiments of the present invention.

FIGS. 5A and 5B, which explains aspects of the script 12, are described infra.

Returning to FIG. 3, execution of the script is implemented in steps 85-87.

In step 85, execution of the script comprises the client computer 10 sending M requests, either: (i) directly and in parallel (i.e., concurrently) to M respective proxy nodes of the P proxy nodes in the proxy layer 20, followed by the respective M proxy nodes sending the respective M requests to M respective storage nodes in the storage layer 30 (see FIG. 6A) or (ii) directly and in parallel (i.e., concurrently) to M respective storage nodes of the N storage nodes in the storage layer 30 (see FIG. 6B). The M requests are for the M respective storage nodes to provide M respective portions of the requested file, wherein the M portions of the requested file are different, non-overlapping portions of the requested file. The requested file comprises the M portions, wherein M has a value subject to 2≤M≤N and M≤P. In one embodiment, M<N. In another embodiment, M=N.

Figure 6A:
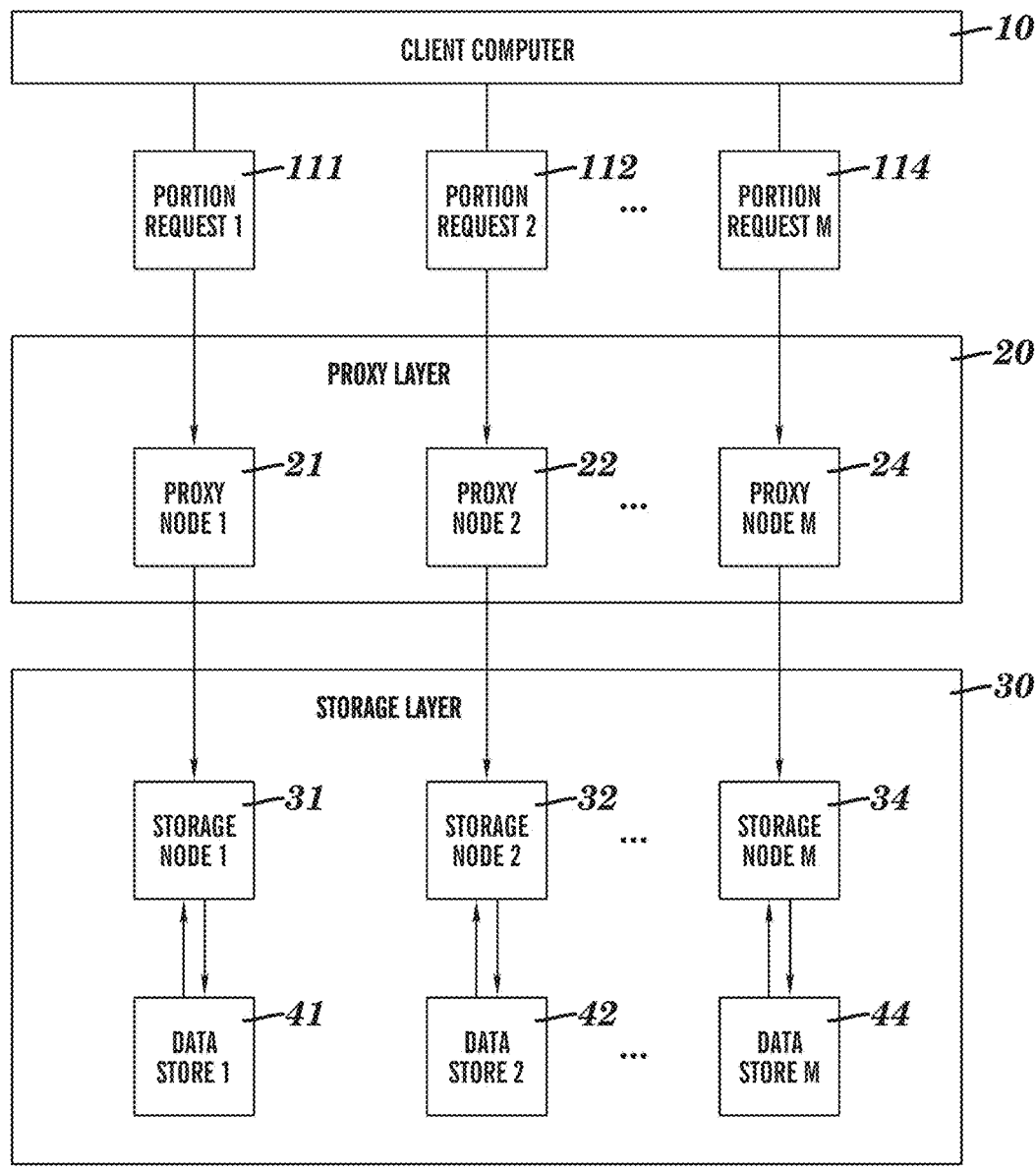
FIG. 6A depicts an embodiment of a step in FIG. 3 in which the client computer sends file portion requests directly and in parallel to respective proxy nodes in the proxy layer, followed by the respective proxy nodes sending the respective requests to respective storage nodes in the storage layer.

FIG. 6A depicts an embodiment of step 85 in which the client computer 10 sends M portion requests (portion request 1, portion request 2, . . . , portion request M denoted by reference numerals 111, 112, . . . , 114, respectively) directly and in parallel (i.e., concurrently) to M respective proxy nodes (21, 22, . . . , 24) of the P proxy nodes in the proxy layer 20, followed by the respective M proxy nodes sending the respective M portion requests to M respective storage nodes (31, 32, . . . , 34) in the storage layer 30. The M portion requests are for the M respective storage nodes to provide M respective portions of the requested file from M respective data stores (41, 42, . . . , 44), wherein the M portions of the requested file are different, non-overlapping portions of the requested file. The requested file comprises the M portions, wherein M has a value subject to 2≤M≤N and M≤P. In one embodiment, M<N. In another embodiment, M=N.

Figure 6B:
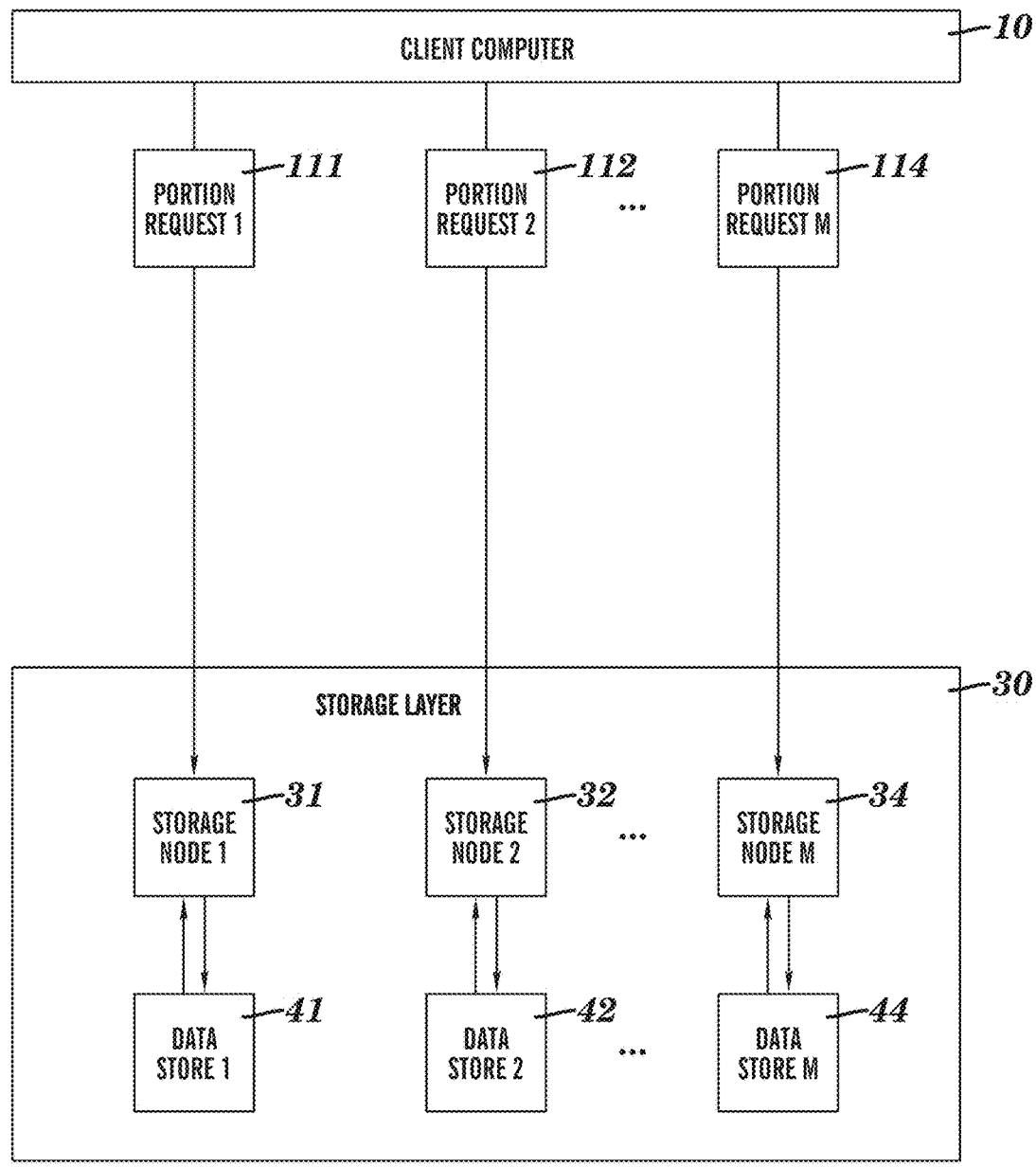
FIG. 6B depicts an embodiment of a step in FIG. 3 in which the client computer sends requests directly and in parallel to respective storage nodes in the storage layer.

FIG. 6B depicts an embodiment of step 85 in which the client computer 10 sends M portion requests (portion request 1, portion request 2, . . . , portion request M denoted by reference numerals 111, 112, . . . , 114, respectively) directly and in parallel (i.e., concurrently) to M respective storage nodes of the N storage nodes in the storage layer 30. The M requests are for the M respective storage nodes (31, 32, . . . , 34) to provide M respective portions of the requested file from M respective data stores (41, 42, . . . , 44), wherein the M portions of the requested file are different, non-overlapping portions of the requested file. The requested file comprises the M portions, wherein M has a value subject to 2≤M≤N and M≤P. In one embodiment, M<N. In another embodiment, M=N.

Various embodiments for determining the M storage nodes for step 85 and the embodiments of FIGS. 6A and 6B will be discussed infra in conjunction with FIG. 5A.

In step 86, execution of the script comprises, after the M portion requests have been sent by the client computer 10 and after the M portions have been read by the M storage nodes 31, 32, . . . , 34 from M respective data stores 41, 42, . . . , 44 of the N data stores: (i) the client computer 10 receives the requested file from a third proxy node of the P proxy nodes after the third proxy node has received the M portions from the M storage nodes and has concatenated, by using the script, the M portions which generates the requested file as a concatenation of the M portions (see FIG. 7A); (ii) the client computer receives the M portions directly from the M proxy nodes, respectively, after the M proxy nodes have received the M portions from the M storage nodes, respectively (see FIG. 7B); or (iii) the client computer 10 receives the M portions directly from the M storage nodes (see FIG. 7C).

In one embodiment, the third proxy node and the first proxy node are a same proxy node. In one embodiment, the third proxy node and the first proxy node are different proxy nodes. In one embodiment, the third proxy node and the second proxy node are a same proxy node. In one embodiment, the third proxy node and the second proxy node are different proxy nodes.

Figure 7A:
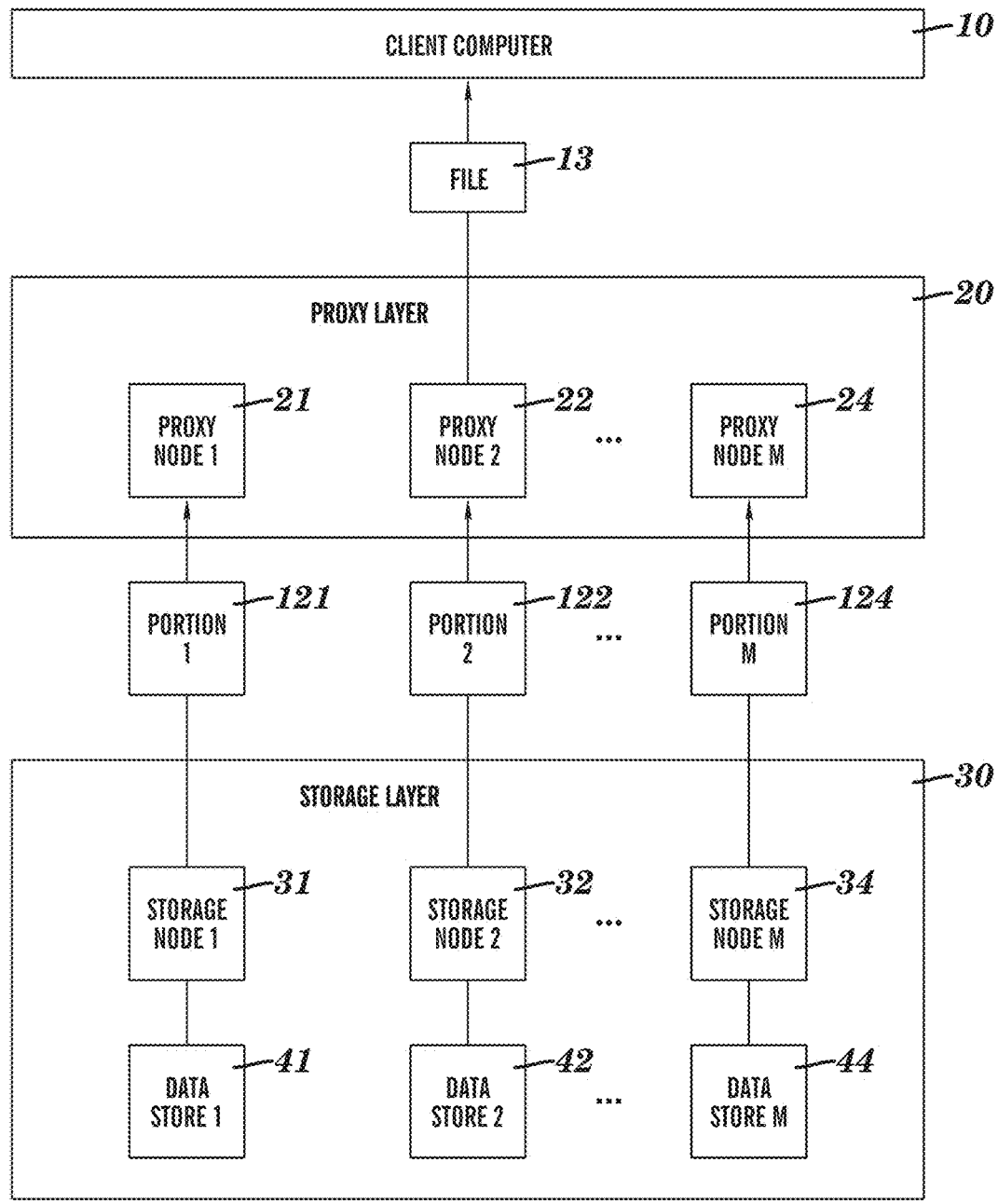
FIG. 7A depicts an embodiment of a step in FIG. 3 in which the client computer receives the requested file from proxy layer.

FIG. 7A depicts an embodiment of step 86 in which the client computer 10 receives the requested file 13 from the third proxy node of the P proxy nodes after the M proxy nodes 21, 22, . . . , 24 have received the respective M portions (portion 1, portion 2, . . . , portion M denoted by reference numerals 121, 122, . . . , 124, respectively) from the respective M storage nodes 31, 32, . . . , 34 which obtained the respective M portions from the respective M data stores 41, 42, . . . , 44, and after the third proxy node has concatenated, by using the script, the M portions which generates, via the script, the requested file 13 as a concatenation of the M portions.

Figure 7B:
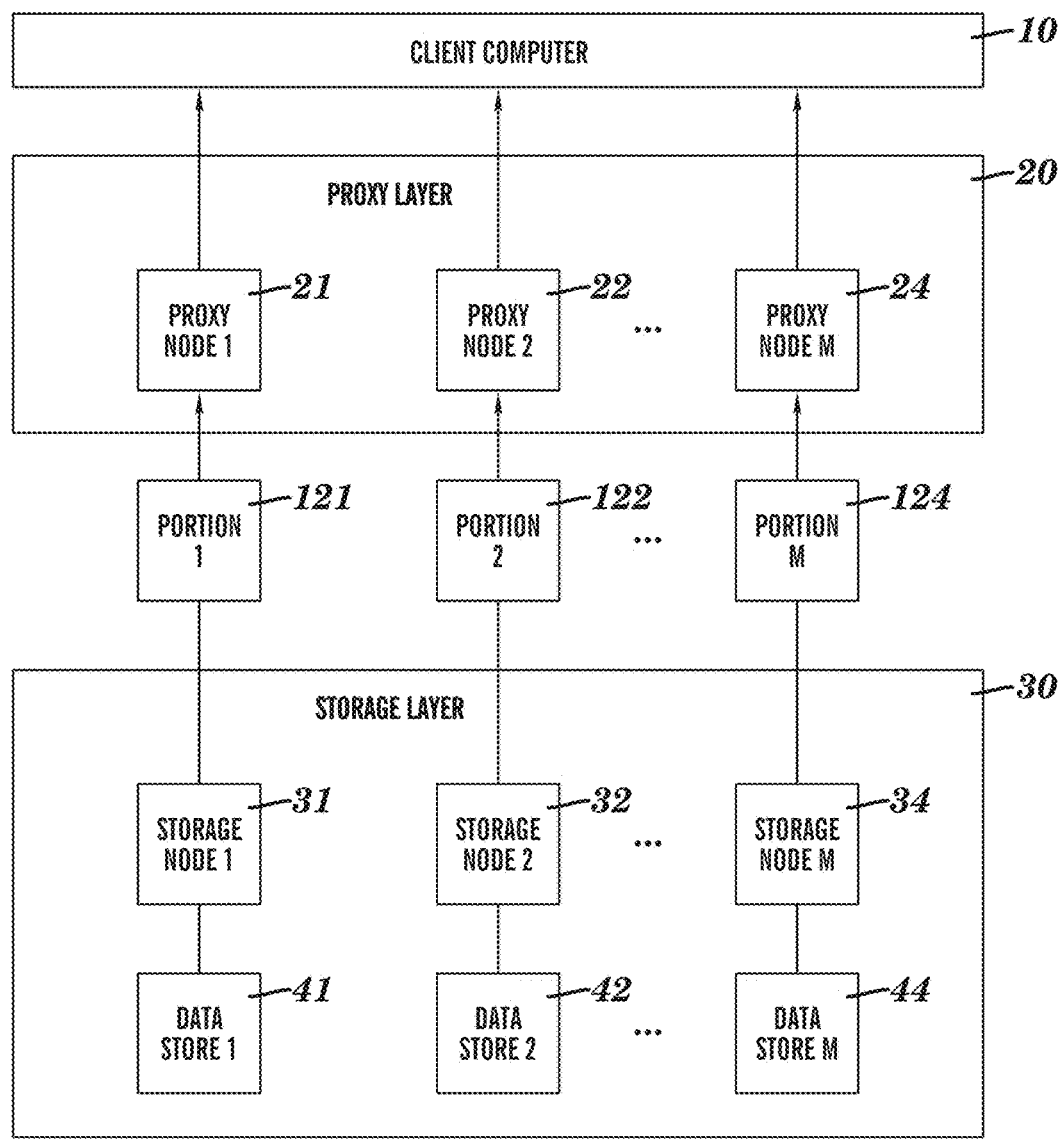
FIG. 7B depicts an embodiment of a step in FIG. 3 in which the client computer receives the file portions directly from respective proxy nodes after the proxy nodes received the file portions from the respective storage nodes which obtained the file portions from respective data stores.

FIG. 7B depicts an embodiment of step 86 in which the client computer 10 receives the Ni portions (portion 1, portion 2, . . . , portion M denoted by reference numerals 121, 122, . . . , 124, respectively) directly from the respective M proxy nodes 21, 22, . . . , 24 after the M proxy nodes received the respective M portions from the respective M storage nodes 31, 32, . . . , 34 which obtained the M portions from the respective M data stores 41, 42, . . . , 44.

Figure 7C:
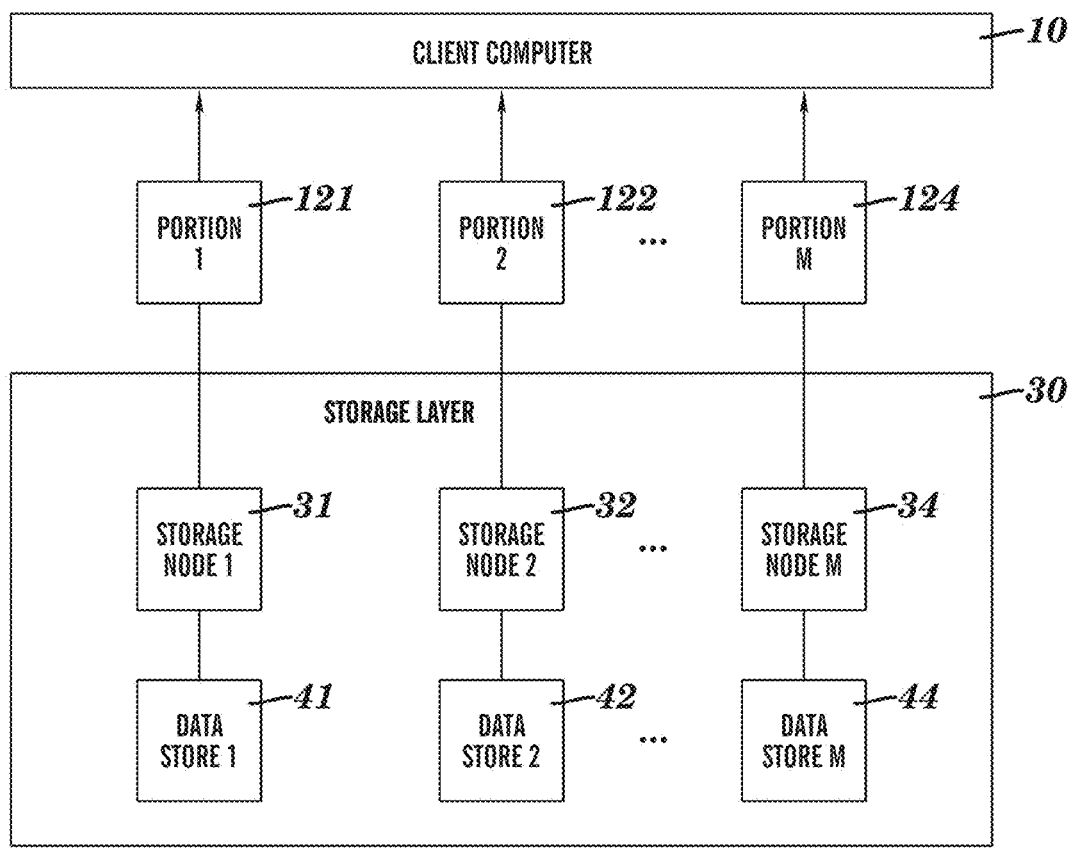
FIG. 7C depicts an embodiment of a step in FIG. 3 in which the client computer receives the file portions directly from respective storage nodes which obtained the file portions from the respective data stores.

FIG. 7C depicts an embodiment of step 86 in which the client computer 10 receives the M portions (portion 1, portion 2, . . . , portion M denoted by reference numerals 121, 122, . . . , 124, respectively) directly from the respective M storage nodes 31, 32, . . . , 34 which obtained the M portions from the respective M data stores 41, 42, . . . , 44.

In step 87, the client computer 10 obtains the requested file.

In the embodiment of FIG. 7A, step 87 is implemented by the client computer 10 obtaining the requested file 13 from the third proxy node in the proxy layer 20.

In the embodiment of FIG. 7B, step 87 is implemented by the client computer 10 concatenating the M portions directly received from the M proxy nodes in the proxy layer 20 to form the requested file as a concatenation of the M portions.

In the embodiment of FIG. 7C, step 87 is implemented by the client computer 10 concatenating the M portions directly received from the M storage nodes in the storage layer 30 to form the requested file as a concatenation of the M portions.

In one embodiment, the M storage nodes are predetermined before the file is requested by the client computer 10 and in this embodiment, either M is predetermined to equal N or M is predetermined to be less than N such that the specific M storage nodes are selected by any criteria such as, inter alia, being randomly selected from the N storage nodes.

In one embodiment, the M storage nodes in the storage layer 30 are dynamically selected from the N storage nodes in response to the request, by the client computer 10, for the file, in accordance with FIG. 5A.

FIG. 5A is a flow chart for determining, by the script generated in step 82 of FIG. 3, the M file copies in respective data stores 1, 2, . . . , M from which respective portions are obtained to form the requested file, which is implemented by selecting M storage nodes from the N storage nodes in the storage layer 30, in accordance with embodiments of the present invention. The flow chart of FIG. 5A includes steps 211-213.

Step 211 determines, for each storage node n of the N storage nodes: an availability (n) of resources (CPU resources, I/O resources, etc.) to storage node n, a geographic distance (Dn) between storage node n and the client computer 10, an average bandwidth (Bn) for data traffic in and out of storage node n, and/or an average response time (Tn) of the response of storage node n to data requests.

Step 212 computes a score Sn, for each storage node n of the N storage nodes, as a function of An, Dn, Bn, and/or Tn (i.e., a function of any one or more of An, Dn, Bn, and Tn, such as, inter alia, a function of An and Dn, a function of Dn, Bn, and Tn, a function of An, Dn, Bn, and Tn, etc.).

In one embodiment Sn is a function An, Dn, Bn, or Tn.

In one embodiment Sn is a function An, Dn, Bn, and Tn.

In one embodiment Sn is a product of at least two of An, Dn, Bn, and Tn (e.g., a product of An and Dn, a product of An, Bn, and Tn; a product of An, Dn, Bn, and Tn, etc.).

In one embodiment Sn is a weighted or unweighted linear combination of An, Dn, Bn, and/or Tn (e.g., a linear combination of An, Dn, and Bn, a linear combination of Dn and Tn, a linear combination of An, Dn, Bn, and Tn, etc.).

In one embodiment Sn is a weighted or unweighted nonlinear combination of An, Dn, Bn, and/or Tn; e.g., a sum of poynomials of order a, d, b, and t in An, Dn, Bn, and Tn, respectively, wherein a, d, b, and t are each a positive integer (1, 2, 3, 4, . . . ) such that at least one of An, Dn, Bn, and in appearing in the nonlinear combination must be a polynomial of order at least 2. For example, Sn may be a weighted or unweighted sum of: a polynomial of order 2 in An, a polynomial of order 1 in Dn, a polynomial of order 3 in Bn, and/or a polynomial of order 2 in Tn.

In one embodiment Sn is a root mean-square of An, Dn, Bn, and Tn; i.e. $Sn=[(An)^2+(DN)^2+(Bn)^2+(Tn)^2]^{1/2}$.

In one embodiment, the values of An, Dn, Bn, and Tn appearing in the function for computing Sn are converted to dimensionless variables and normalized to be within a predefined numerical range such as 0 to 1.

Step 213 selects M storage nodes from the N storage nodes based on the scores Sn (n=1, 2, . . . , N).

In one embodiment, step 213 selects the M storage nodes consisting of those storage nodes n (n=1, 2, . . . , N) whose score Sn exceeds a predetermined threshold.

In one embodiment, the value of M is a predetermined value less than N, and step 213 selects the M storage nodes consisting of those storage nodes n (n=1, 2, . . . , N) having the M highest scores Sn.

After the M storage nodes in the storage layer 30 are determined, the respective portions within the M file copies in the respective M data stores are determined for forming the requested file for the client computer 10.

In one embodiment, the file portions in the M file copies may be predetermined before the file is requested by the client computer 10. The relative sizes of the predetermined portions in each file copy may be about a same relative size for each file copy.

In one embodiment, the relative sizes of the portions in each file copy may vary among the different file copies in accordance with FIG. 5B.

FIG. 5B is a flow chart for determining, by the script generated in step 82 of FIG. 3, the file portions in the M file copies in respective M data stores in the storage layer 30, in accordance with embodiments of the present invention. The flow chart of FIG. 5B includes steps 311-313.

Step 311 determines, for each storage node m of the M storage nodes: an availability (Am) of resources (CPU resources. I/O resources, etc.) to storage node m and an average response time (Tm) of the response of storage node m to data requests.

Step 312 computes a product (Pm) of Am and Tm for each storage node m of the M storage nodes.

Step 313 determines portions of the file copy in data store m of the M data stores, based on Pm (m=1, 2, . . . , M).

The following example illustrates the methodology of FIG. 5B. Consider FIG. 2 with M=3. Data stores 1, 2, and 3 (depicted as 41, 42, and 45) are coupled to storage nodes 1, 2, and 3 (depicted as 31, 32, and 35) and the file portions 51, 62, and 73 will be used to form the requested file. The methodology of FIG. 5B determines the relative sizes of the portions 51, 62, and 73 as follows. The storage nodes 1, 2, and 3 are assumed in this example to have the same availability, so that $A_1=A_2=A_3=1$. The relative response times are assumed in this example to be $T_1=100$, $T_2=150$, and $T_3=250$. After normalization of Am and Tm to between 0 and 1, the products Pm=Am*Tm are: $P_1=0.20$ (i.e., 100/500), $P_2=0.30$ (i.e., 150/500) and $P_3=0.50$ (i.e., 250/500). Therefore, file portions 51, 62, and 73 are 20%, 30%, and 50%, of the length of the file copy 50, 60, and 70, respectively. Thus, if the file encompasses 60 equally-sized blocks of data, the first 12 blocks will be obtained from file portion 51, the next 18 blocks will be obtained from file portion 62, and the last 30 blocks will be obtained from file portion 73.

Figure 8:
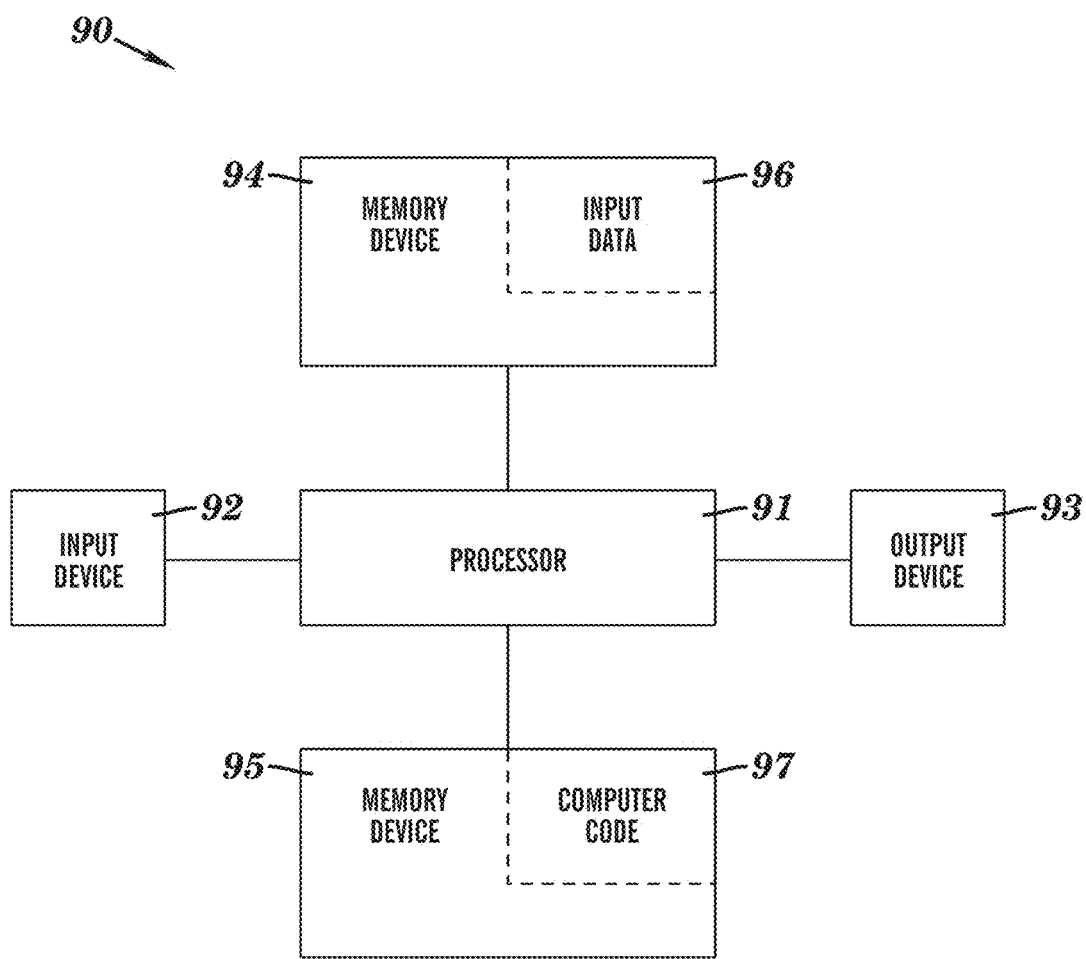
FIG. 8 illustrates a computer system used for retrieving a file from a distribution of storage nodes, in accordance with embodiments of the present invention.

FIG. 8 illustrates a computer system 90 used for retrieving a file from a distribution of storage nodes, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter cilia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that comprises computer-executable instructions. The computer code 97 includes software or program instructions that may implement an algorithm for retrieving a file from a distribution of storage nodes. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 8) may be used as a computer usable storage medium (or program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

Thus the present invention discloses a process for supporting, deploying and/or integrating computer infrastructure, integrating, hosting, maintaining, and deploying computer-readable code into the computer system 90, wherein the code in combination with the computer system 90 is capable of performing a method for retrieving a file from a distribution of storage nodes.

In another embodiment, the invention provides a method that performs the process steps of the invention on a subscription, advertising, and/or fee basis. In this case, the service provider can create, integrate, host, maintain, deploy, manage, service, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 8 shows the computer system 90 as a particular configuration of hardware and software, any configuration of hardware and software, as would be known to a person of ordinary skill in the art, may be utilized for the purposes stated supra in conjunction with the particular computer system 90 of FIG. 8. For example, the memory devices 94 and 95 may be portions of a single memory device rather than separate memory devices.

Each of the computers in FIG. 1 (client computer, proxy nodes, storage nodes) may utilize a computer system such as computer system 90.

The present invention may be a system, a method, and/or a computer program product. The computer program product may include a computer readable storage medium (or medial having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer system, comprising a client computer, said client computer comprising one or more processors, one or more memories and one or more computer readable storage devices storing computer readable program code which, upon being executed by the one or more processors via the one or more memories, implement a method for retrieving a file from a distribution of storage nodes, said method comprising:

said client computer sending, to a first proxy node of P proxy nodes in a proxy layer, a request for the file, wherein each proxy node of the P proxy nodes is a computer, wherein a copy of the file is stored in each data store of N data stores, wherein each data store of the N data stores may be accessed by a respective storage node of N storage nodes, wherein each storage node of the N storage nodes is a computer, and wherein $N \geq 2$ and $P \geq 2$;

after said sending the request for the file, said client computer receiving, from a second proxy node of the P proxy nodes, a script for obtaining the requested file;

said client computer executing the received script, wherein said executing the script comprises said client computer sending M requests, either directly and in parallel to M respective proxy nodes of the P proxy nodes or directly and in parallel to M respective storage nodes of the N storage nodes, wherein the M requests are for the M storage nodes to provide M respective portions of the requested file, wherein the M portions are different, non-overlapping portions of the requested file, wherein the requested file comprises the M portions, and wherein 2≤M≤N and M≤P;

after said sending the M requests and after the M portions have been read by the M storage nodes from M respective data stores of the N data stores: (i) said client computer receiving the requested file from a third proxy node of the P proxy nodes after the M proxy nodes have received the respective M portions from the M storage nodes and after the third proxy node has concatenated, by using the script, the M portions which generates the requested file as a concatenation of the M portions, (ii) said client computer receiving the M portions directly from the M proxy nodes after the M proxy nodes have received the M portions from the M storage nodes, respectively, or (iii) said client computer receiving the M portions directly from the M storage nodes; and if said client computer received the M portions directly from the M proxy nodes or directly from the M storage nodes, then said client computer concatenating, by the script, the M portions, which generates the requested file as a concatenation of the M portions.

2. The computer system of claim 1, said client computer receiving the requested file from the third proxy node.

3. The computer system of claim 1, said client computer receiving the M portions directly from the M storage nodes.

4. The computer system of claim 1, said client computer receiving the M portions directly from the M proxy nodes.

5. The computer system of claim 1, said client computer sending the M requests directly to the M respective storage nodes.

6. The computer system of claim 1, said client computer sending the M requests directly to the M respective proxy nodes, after which the M requests are sent by the M proxy nodes to the M respective storage nodes.

7. A computer program product, comprising one or more computer readable storage devices storing computer readable program code which, upon being executed by one or more processors, implement a method for retrieving a file from a distribution of storage nodes, said method comprising:

sending, by a client computer to a first proxy node of P proxy nodes in a proxy layer, a request for the file, wherein each proxy node of the P proxy nodes is a computer, wherein a copy of the file is stored in each data store of N data stores, wherein each data store of the N data stores may be accessed by a respective storage node of N storage nodes, wherein each storage node of the N storage nodes is a computer, and wherein N≥2 and P≥2;

after said sending the request for the file, said client computer receiving, from a second proxy node of the P proxy nodes, a script for obtaining the requested file;

said client computer executing the received script, wherein said executing the script comprises said client computer sending M requests, either directly and in parallel to M respective proxy nodes of the P proxy nodes or directly and in parallel to M respective storage nodes of the N storage nodes, wherein the M requests are for the M storage nodes to provide M respective portions of the requested file, wherein the M portions are different, non-overlapping portions of the requested file, wherein the requested file comprises the M portions, and wherein 2≤M≤N and M≤P;

after said sending the M requests and after the M portions have been read by the M storage nodes from M respective data stores of the N data stores: (i) said client computer receiving the requested file from a third proxy node of the P proxy nodes after the M proxy nodes have received the respective M portions from the M storage nodes and after the third proxy node has concatenated, by using the script, the M portions which generates the requested file as a concatenation of the M portions, (ii) said client computer receiving the M portions directly from the M proxy nodes after the M proxy nodes have received the M portions from the M storage nodes, respectively, or (iii) said client computer receiving the M portions directly from the M storage nodes; and if said client computer received the M portions directly from the M proxy nodes or directly from the M storage nodes, then said client computer concatenating, by the script, the M portions, which generates the requested file as a concatenation of the M portions.

8. The computer program product of claim 7, said client computer receiving the requested file from the third proxy node.

9. The computer program product of claim 7, said client computer receiving the M portions directly from the M storage nodes.

10. The computer program product of claim 7, said client computer receiving the M portions directly from the M proxy nodes.

11. The computer program product of claim 7, said client computer sending the M requests directly to the M respective storage nodes.

12. The computer program product of claim 7, said client computer sending the M requests directly to the M respective proxy nodes, after which the M requests are sent by the M proxy nodes to the M respective storage nodes.

13. A computer system, comprising one or more processors, one or more memories and one or more computer readable storage devices storing computer readable program code which, upon being executed by the one or more processors via the one or more memories, implement a method for retrieving a file from a distribution of storage nodes, said method comprising:

receiving, from a client computer by a first proxy node of P proxy nodes in a proxy layer, a request for the file, wherein each proxy node of the P proxy nodes is a computer, wherein a copy of the file is stored in each data store of N data stores, wherein each data store of the N data stores may be accessed by a respective storage node of N storage nodes, wherein each storage node of the N storage nodes is a computer, and wherein N≥2 and P≥2;

in response to the request for the file, a second proxy node of the P proxy nodes generating a script;

said second proxy node sending the generated script to the client computer, after which the script is executed by the client computer, wherein during execution of the script by the client computer, M requests are sent by the client computer either directly and in parallel to M respective proxy nodes of the P proxy nodes or directly and in parallel to M respective storage nodes of the N storage nodes, wherein the M requests are for the M storage nodes to provide M respective portions of the requested file, wherein the M portions are different, non-overlapping portions of the requested file, wherein the requested file comprises the M portions, and wherein 2≤M≤N and M≤P, wherein after the M requests have been sent by the client computer and after the M portions have been read by the M storage nodes from M respective data stores of the N data stores: (i) the requested file is received by the client computer from a third proxy node of the P proxy nodes after the third proxy node has received the M portions from the M storage nodes and has concatenated the M portions which generates the requested file as a concatenation of the M portions, (ii) the M portions are received directly by the client computer from the M storage nodes, or (iii) said M proxy nodes receiving the M portions from the M storage nodes, respectively, and the M proxy nodes sending the M portions directly to the client computer, wherein if the M portions are received by the client computer directly from the M storage nodes or directly from the M proxy nodes, then the client computer is enabled to concatenate, by the script, the M portions to generate the requested file as a concatenation of the M portions.

14. The computer system of claim 13, wherein the requested file is received by the client computer from the third proxy node.

15. The computer system of claim 13, wherein the M portions are received directly by the client computer from the M storage nodes.

16. The computer system of claim 13, said M proxy nodes receiving the M portions from the M storage nodes, respectively, and the M proxy nodes sending the received M portions directly to the client computer.

17. The computer system of claim 13, wherein the M requests are sent by the client computer directly to the M respective storage nodes.

18. The computer system of claim 13, wherein the M requests are sent by the client computer directly to the M proxy nodes, respectively, after which said M proxy nodes sending the M requests to the M respective storage nodes.

19. The computer system of claim 13, wherein M<N, and wherein said generating the script comprises selecting the M storage nodes from the N storage nodes, and wherein said selecting the M storage nodes comprises:

computing, for each storage node n of the N storage nodes, a score $S_n$ as a function of: an availability ($A_n$) of resources to storage node n, a geographic distance ($D_n$) between storage node n and the client computer, an average bandwidth ($B_n$) for data traffic in and out of storage node n, an average response time ($T_n$) of the response of storage node n to data requests, or combinations thereof; and determining the M storage nodes from the N storage nodes based on the scores $S_n$ (n=1, 2, . . . , N).

20. The computer system of claim 19, wherein said determining the M storage nodes comprises:

determining the M storage nodes as those storage nodes whose score $S_n$ exceeds a predetermined threshold.

* * * * *